US008935206B2

(12) United States Patent
Aguilera et al.

(10) Patent No.: US 8,935,206 B2
(45) Date of Patent: Jan. 13, 2015

(54) SNAPSHOTS IN DISTRIBUTED STORAGE SYSTEMS

(75) Inventors: Marcos K. Aguilera, Mountain View, CA (US); Alistair Veitch, Mountain View, CA (US); Susan Spence, Cambridge (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 2225 days.

(21) Appl. No.: 11/700,270

(22) Filed: Jan. 31, 2007

(65) Prior Publication Data

US 2008/0183973 A1  Jul. 31, 2008

(51) Int. Cl.
*G06F 17/30* (2006.01)
*G06F 11/20* (2006.01)
*G06F 11/14* (2006.01)
*G06F 11/18* (2006.01)

(52) U.S. Cl.
CPC ........ *G06F 11/2094* (2013.01); *G06F 11/1464* (2013.01); *G06F 11/1469* (2013.01); *G06F 11/182* (2013.01)
USPC ........... 707/638; 707/637; 707/639; 709/223; 709/224; 711/161; 711/162

(58) Field of Classification Search
CPC ............ G06F 11/1464; G06F 11/1469; G06F 11/182; G06F 11/2094
USPC .......................... 707/637–639; 709/223–224; 711/161–162
See application file for complete search history.

(56) References Cited

U.S. PATENT DOCUMENTS

| 5,649,200 | A  | * | 7/1997  | Leblang et al.  | 717/122 |
|-----------|----|---|---------|-----------------|---------|
| 5,812,773 | A  | * | 9/1998  | Norin           | 709/204 |
| 7,403,960 | B2 | * | 7/2008  | Kodama          | 707/639 |
| 7,478,263 | B1 | * | 1/2009  | Kownacki et al. | 714/4.11 |
| 2005/0065986 | A1 | * | 3/2005 | Bixby et al.   | 707/204 |
| 2005/0160243 | A1 | * | 7/2005 | Lubbers et al. | 711/162 |
| 2006/0271604 | A1 | * | 11/2006 | Shoens        | 707/201 |
| 2007/0106706 | A1 | * | 5/2007 | Ahrens et al. | 707/202 |
| 2007/0245105 | A1 | * | 10/2007 | Suzuki et al. | 711/162 |

OTHER PUBLICATIONS

David K. Gifford, "Weight Voting for Replicated Data", In Proceedings of the 7th Symposium on Operating System Principles (SOSP 1979), pp. 150-162, 1979.*
Herlihy, Maurice, "a Quorum-Consensus Replication Method for Abstract Data Types", ACM Transaction son Computer Systems, vol. 4, No. 1, 1986, pp. 32-53.*
Lin, Ching-Min et al. "a New Quorum-Based Scheme for Managing Replicated Data in Distributed Systems", IEEE, 2002.*
Internet Archive Wayback Machine, Apr. 20, 2005 (2 pages).*
Gifford, David K. (1979). "Weighted voting for replicated data". SOSP '79: Proceedings of the seventh ACM symposium on Operating systems principles. Pacific Grove, California, United States: ACM. pp. 150-162.*

(Continued)

*Primary Examiner* — Shew-Fen Lin

(57) ABSTRACT

Embodiments include methods, apparatus, and systems for snapshots in distributed storage systems. One method of software execution includes using a version tree to determine what data blocks are shared between various storage nodes in the version tree in order to create a clone or a snapshot of a storage volume in a distributed storage system that uses quorum-based replication.

10 Claims, 7 Drawing Sheets

(56) References Cited

OTHER PUBLICATIONS

M. K. Aguilera and S. Frolund. Strict linearizability and the power of aborting. Technical Report HPL-2003-241. HP Laboratories, 2003.

H. Attiya, A. Bar-Noy, and D. Dolev. Sharing memory robustly in messagepassing systems. Journal of the ACM, 42 (1):124-142. Jan. 1995.

S. Frolund. A. Merchant, Y. Saito, S. Spence, and A. Veitch. A decentralized algorithm for erasure-coded virtual disks. Jn Proceedings of the International Conference on Dependable Systems and Networks (DSN 2004). pp. 125-134, Jun. 2004.

H. Garcia-Molina and D. Barbara. How to assign votes in a distributed system. Journal of the ACM, 32(4):841-860, Oct. 1985.

D. Gifford. Weighted voting for replicated data. In Proceedings of the 7th Svmposium on Operating Systems Principles (SOSP 1979). pages 150-162, Dec. 1979.

S. Gilbert, N. Lynch, and A. Shvartsman. Rambo II: Rapidly reconfigurable atomic memory for dynamic networks. In Proceedings of the International Conference on Dependable System> and Networks (DSN 2003), pp. 259268. Jun. 2003.

V. Hadzilacos and S. Toueg. A modular approach to fault-tolerant broadcasts and related problems. Technical Report TR 94/1425, Cornell University, Dept. of Computer Science, Cornell University, Ithaca, NY 14853, May 1994.

M. Herlihy and J. Wing. Linearizability: a correctness condition for concurrent object.;;. ACM Transactions on Programming Languages and Systemf, 12(3):463-492, Jul. 1990.

D. Hitz, J. J Lau, M. and M Malcolm. File system design for an NFS file server appliance. In Proceedings of the USENIX Winter I 994 Technical Coeference. pp. 235-246, Jan. 1994.

I M. Ji. Instant snapshots in a federated array of bricks. Technical Report HPL-2005-15. HP Laboratories Palo Alto, Jan. 2005.

Lamport. Time, clocks, and the ordering of evenls in a distributed system. Communications of the ACM, 21(7):558-565, Jul. 1978.

L. Lamport. How to make a multiprocessor computer that correctly executes multiprocess programs. IEEE Transactions on Computers. 28(9). Sep. 1979.

E. K. Lee and C. A. Thekkath. Petal: Distributed virtual disks. In Proceedings of the Seventh International Conference on Architectural Support for Programming Languages and Operating Systems (ASPLOS 1996), pp. 84-92, Oct. 1996.

N. A. Lynch and A. A. Shvartsman. Robust emulation of shared memory using dynamic quorum-acknowledged broadcasts. In Proceedings of the 27th International Symposium on Fault-Tolerant Computing (FTCS 1997), pp. 272-281, Jun. 1997.

N. A. Lynch and A. A. Shvartsman. RAMBO: A reconfigurable atomic memory service for dynamic networks. In Proceedings of the 16th International Conference on Distributed Computing (DISC 2002 ), pp. 173-190, Oct. 2002.

G. Ozsoyoglu and R. T. Snodgrass. Temporal and real-time databases: A survey. IEEE Transactions on Knowledge and Data Engineering, 7(4):513532, Aug. 1995.

R. Pike, D. Presotto, S. Dorward, B. Flandrena, K. Thompson, H. Trickey, and P. Winterbottom. Plan 9 from Bell Labs. Computing System>, 8(3):221254, Summer 1995.

Y. Saito, S. Frolund, A. Veitch, A. Merchant, and S. Spence. Fab: building distributed enterprise disk arrays from commodity components. In Proceedings qfthe 11th international conference on Architectural support for programming languages and operating system> (ASP LOS 2004), pp. 4858.Oct. 2004.

D.S. Santry, M. J. Feeley, N. C. Hutchinson, A. C. Veitch, R. W. Carton, and J. Ofir. Deciding when to forget in the elephant file system. In Proceedings of the 17th ACM Symposium on Operating Systems Principles (SOSP 1999), pp. 110-123, Dec. 1999.

J Satran, K. Meth, C. Sapuntzakis, M. Chadalapaka, and E. Zeidner. RFC3720: Internet small computer systems interface (iSCSI). http://www.faqs.org/rfcs/rfc3720.html, 2004.

L. Shrira and H. Xu. Snap: Efficient snapshots for back-in-time execution. In Proceedings of the 21st International Conference on Data Engineering (ICDE 2005), pp. 351-364, Mar. 2004.

M. Stonebraker. The design of the POSTGRES storage system. In Proceedings of the 13th International Conference on Very Large Data Bases (VWB 1987). pages 289-300, Sep. 1987.

C. A. Thekkath. T. Mann, and E. K. Lee. Frangipani: A scalable distributed file system. In Proceedings of the 16th ACM Symposium on Operating Systems Principles (SOSP 1997). pp. 224-237, Oct. 1997.

J. L. Welch. Simulating synchronous processors. Information and Computation, 74(2):159-171, Aug. 1987.

L. Lamport. On interprocess communication; part I: Basic formalism. Distributed Computing, 1(2):77-85, 1986.

L. Lamport. The part-time parliament. ACM Transactions on Computer Systems, 16(2):133169, 1998.

* cited by examiner

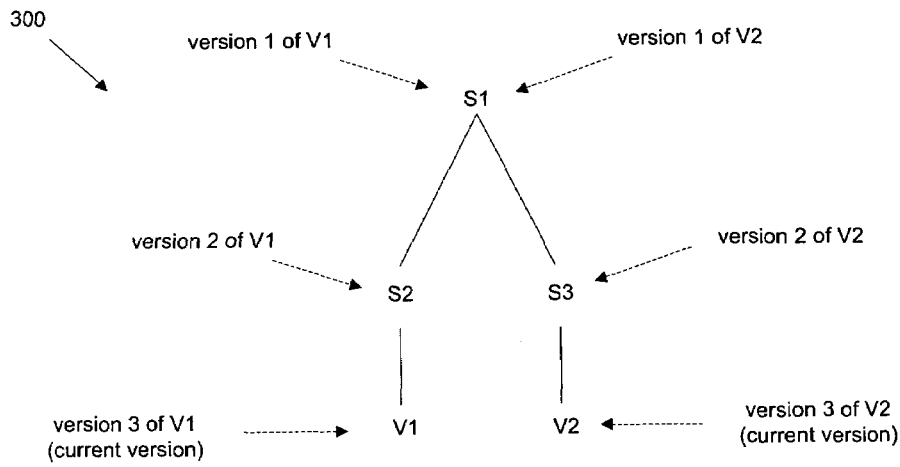

FIG. 3

To broadcast(m):                                                          600 for i ← 1 to 4 do
    send ‹NEW, i, m› to all
    wait to receive ‹NEW-REP, i, m› from a majority from each replica group
return upon receive ‹NEW, i, m› from q
    send ‹NEW-REP, i, m› to q
    if i = 2 and has not yet delivered m
    then deliver m
    if i = 3 and has not yet confirmed m
    then confirm m Task check:
    repeat periodically forever
        if for some m and j ≤, received ‹NEW, j, m› long ago, but
            never received ‹NEW, j + 1, m› then
                for i ← j to 4 do
                      send ‹NEW, i, m› to all
                      wait to receive ‹NEW-REP, i, m› from a majority.

FIG. 6

SNAPSHOTS IN DISTRIBUTED STORAGE SYSTEMS

BACKGROUND

The ability to replicate and store data is an important feature in many storage systems. In some storage systems, data is replicated at many storage devices to safeguard against the failure of a single storage device or medium. Upon a failure of a first storage device or medium, the system retrieves a copy of the data contained in a second storage device or medium. Users are able to recover data that is inadvertently erased or edited.

In distributed storage systems, data can be stored at different nodes throughout the system. In some systems, a coordinator manages data flow to and from the various nodes. As the coordinator receives updated data, these updates are sent to plural different nodes for storage throughout the system.

Some distributed storage systems are susceptible to partial writes. A partial write occurs when the coordinator crashes while propagating new data to the various nodes. In this instance, complete copies of the data only arrive at a minority number of nodes. The storage system is left in a non-deterministic state because a subsequent read from a node can return either a new or old value, depending on whether the majority that reads intersects or not the minority that wrote it.

Some storage systems and storage software products provide ways to make point-in-time copies of disk volumes, sometimes referred to as snapshots or clones (a clone is a writable snapshot). The process or making point-in-time copies needs to be carefully performed so that the snapshots and clones accurately reflect the data. An inconsistent state can occur when old and new versions of different blocks of data are mixed.

BRIEF DESCRIPTION OF THE DRAWINGS

FIG. 3 is a diagram illustrating version numbers associated with writable volumes V1 and V2 for a given version tree in accordance with an exemplary embodiment of the present invention.

FIG. 6 provides an exemplary algorithm for uniform confirmed broadcast by using point-to-point messages in accordance with an exemplary embodiment of the present invention.

DETAILED DESCRIPTION

Figure 1A:
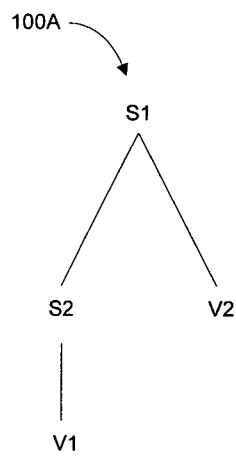
FIG. 1A is a first example of a version tree in accordance with an exemplary embodiment of the present invention.

Embodiments in accordance with the present invention are directed to apparatus, systems, and methods for providing snapshots (i.e., copies at a given point-in-time) or clones (i.e., snapshots that are writable) in a distributed storage system that employs quorum-based replication. As will be explained in more detail below, in one exemplary embodiment, a distributed block storage system provides point-in-time branching.

One exemplary embodiment provides point-in-time branching of storage or the ability to recursively fork off storage branches that independently evolve in a replicated distributed storage system. Branching storage includes two basic functions: snapshots and clones. As used herein, a "snapshot" is a read-only copy that preserves the state of storage at a given point in time, while a "clone" is a copy that can change independently of its source. These storage branches are recursive, meaning that branches are created off other branches. Thus, a snapshot of a volume is a data collection that retains the past contents of a volume despite subsequent updates. Snapshots are useful for archiving data or in other situations where old versions of data are needed. Snapshots are accessible as a storage volume so that applications that run on regular storage can also run on snapshots. The volume from which a snapshot originates is called a source.

In contrast to a snapshot, a clone of a volume is another volume that starts out as a virtual copy buy may later diverge and allow data to evolve in multiple concurrent ways. In one exemplary embodiment, all volumes are clonable, including clones and snapshot volumes themselves. Cloning a volume results in a new writable volume whose initial contents are identical to the source volume. While the data in a clone can change, the snapshot retains its original data. Further, it is possible to clone a snapshot multiple times.

As used herein, "distributed" means that an embodiment is implemented by multiple storage nodes and is usable by multiple application nodes. Further, "block-based storage" means that storage is accessed through fixed-length units called blocks. As one example, a block is 512 bytes. Further yet, at least one exemplary embodiment provides point-in-time branching that implements both snapshots and clones of a storage volume.

Branching storage has many uses that become more important as the size of storage increases without a corresponding increase in data transfer rates. As an example application, suppose that a user wishes to install and test a software upgrade without disturbing the current working version. Without branching storage, this installation could involve copying large amounts of application data and environment state, which can take hours or days. With branching storage, the user creates a storage clone very quickly and installs the upgrade on the clone without disturbing the original version. As another application, suppose that an administrator wishes to provision storage to many homogeneous computers from a "golden" copy, as is often needed in a computer lab, store, or data center. Without branching storage, this process involves copying entire storage volumes many times. With branching distributed storage, the administrator clones the golden copy once for each computer. Besides being fast to create, clones are space efficient because they share common unmodified blocks.

In order to provide point-in-time branching storage systems that are efficient, distributed, broadly applicable, and fault tolerant, exemplary embodiments enable branching at low levels (block storage) and preclude changes to storage clients. Branching functionality can be designed at one or more of various levels, including database systems, file systems, object stores, or block storage. By choosing block storage, exemplary embodiments are able to branch file systems, database systems, or any application that ultimately stores data on block storage. Further, changes to storage clients are a huge inhibitor for adoption of new storage solutions, due to the large existing base of clients and applications. Thus, exemplary embodiments do not require storage clients to be modified in any way: they do not need to run special protocols, install special drivers, or use special storage paradigms. Instead, exemplary embodiments support an industry-standard storage protocol, such as iSCSI (internet small computer system interface). Clones and snapshots are presented as regular block volumes on a network.

Quorum-based data replication provides fault tolerance and various other benefits. First, the system requires only a quorum or a majority of replicas to be accessible to a client at any time. Second, the accessible quorum can vary with different clients, due to their placement in the network for example, and over time, due to transient network behavior or brick failures. Third, if a client cannot access a quorum, part of the storage becomes temporarily unavailable to that client, but neither storage integrity nor other clients are affected.

Exemplary embodiments in accordance with the invention are utilizable with either a quorum or majority. Thus, although some exemplary embodiments are discussed with a quorum, a majority is also applicable.

Exemplary embodiments also provide both consistency and linearizability. By way of example, linearizability requires that operations appear to occur at a single point in time between the start and end of the operation. For branching storage, this means that if a clone or snapshot is requested at time T1 and completes at time T2>T1, then it captures the global state of storage at a single point in time between T1 and T2. Linearizability implies other forms of consistency used in storage systems as well, such as sequential consistency, causal consistency, and crash consistency. Crash consistency means that a branch initially captures some state that could have resulted from a crash, and applications typically know how to recover from such states.

Quorum-based replication distributes data at plural storage nodes (also known as bricks) in a distributed storage system so if one or more storage nodes crash, data is not lost. In one exemplary distributed system, nodes in the network send point-to-point messages over network links to communicate with each other. Some nodes in the network are storage nodes or bricks (as used herein the terms "storage node" and "brick" are synonymous). Other nodes in the network include clients running storage applications, such as file systems or database systems. For example, clients use one or more standard protocols to send a read or write request to a single brick. The brick executes the client request and returns the result back to the client using a standard storage protocol.

Embodiments in accordance with the present invention utilize various ways to represent relationships between volumes using one or more version trees. By way of illustration, FIGS. 1A-1C show examples of version trees, shown as 100A, 100B, and 100C, respectively.

The version tree is a data structure that exemplary embodiments use to describe the relationship between various storage branches, where each branch is a volume. A volume is a set of blocks, but in general a volume can be any set of data objects that are branched together. Nodes in the version tree correspond to volumes, where a leaf node corresponds to a writable volume, and the ancestors of the leaf node correspond to all its snapshots, with the most recent snapshots closer to the leaf. Inner nodes in the tree are always (read only) snapshot volumes.

Figure 1B:
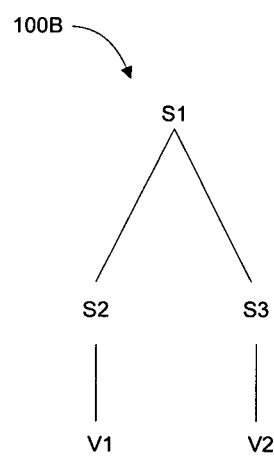
FIG. 1B is a second example of a version tree in accordance with an exemplary embodiment of the present invention.
Figure 1C:
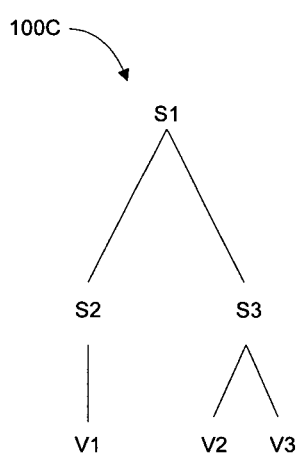
FIG. 1C is a third example of a version tree in accordance with an exemplary embodiment of the present invention.

By way of example, FIG. 1A shows a tree with two leaves, V1 and V2, which are writable volumes, and two snapshots of V1: S1 and S2. S1 is also a snapshot of V2. This case occurs if V2 is created as a clone of S1. FIG. 1B shows how the tree changes if a user takes a snapshot S3 of V2: S3 is the parent of V2 because S3 is V2's most recent snapshot. FIG. 1C shows what occurs if the user subsequently creates a clone of S3.

Figure 1D:
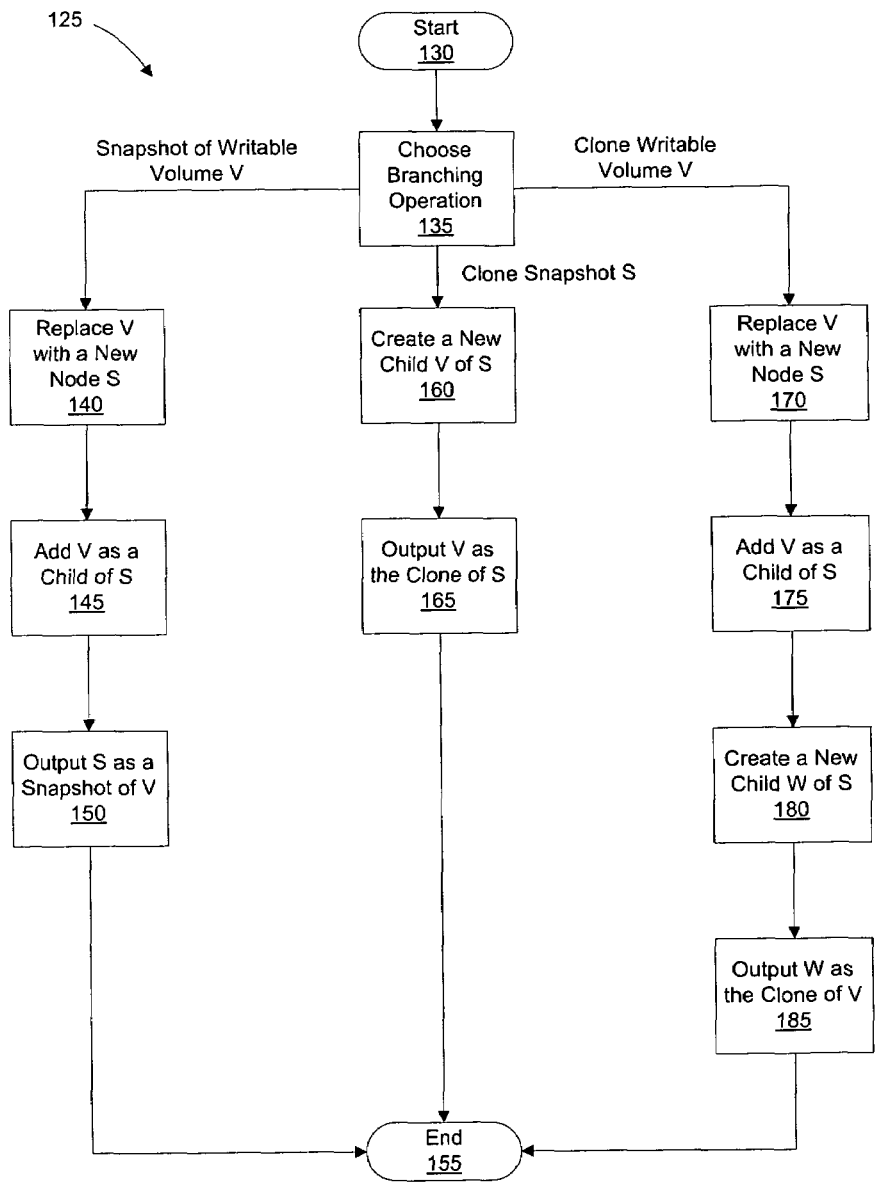
FIG. 1D is an exemplary procedure for updating a version when a branching operation occurs in accordance with an exemplary embodiment of the present invention.

FIG. 1D is an exemplary procedure 125 for updating a version when a branching operation occurs in accordance with an exemplary embodiment of the present invention. The procedure starts at block 130 and flows to block 135 wherein a choice is made between three different branching operations: (1) snapshot of writable volume V, (2) clone of snapshot S, and (3) clone of writable volume V.

For the first option (snapshot of writable volume V), replace V with a new node S per block 140. Next, add V as a child of S per block 145. Then, output S as the snapshot of V per block 150 and then end 155.

For the second option (clone snapshot S), create a new child V or S per block 16. Next, output V as the clone of S per block 165 and then end 155.

For the third option (clone writable volume V), replace V with a new node S per block 170. Next, add V as a child of S per block 175. Then, create a new child W of S per block 180. Next, output W as the clone of V per block 185 and then end 155.

Exemplary embodiments in accordance with the present invention provide a replicated storage system that supports branching to maintain two forms of consistency: replica consistency (i.e., ensuring that replicas have compatible states) and branching consistency (i.e., ensuring that snapshots and clones have meaningful contents). Replica consistency is a form of consistency that is internal to the storage system, while branching consistency is visible to storage clients.

Linearizability is one way to define exactly what branching consistency is. Linearizability considers operations that have non-zero durations and requires each operation to appear to take place at a single point in time. This point is between the start and the end of the operation. For branching storage, by definition the operations are read, write, clone, and take snapshot. Further, the start of an operation is when a client requests the operation, and the end is when the client receives a response or acknowledgement.

Figure 2:
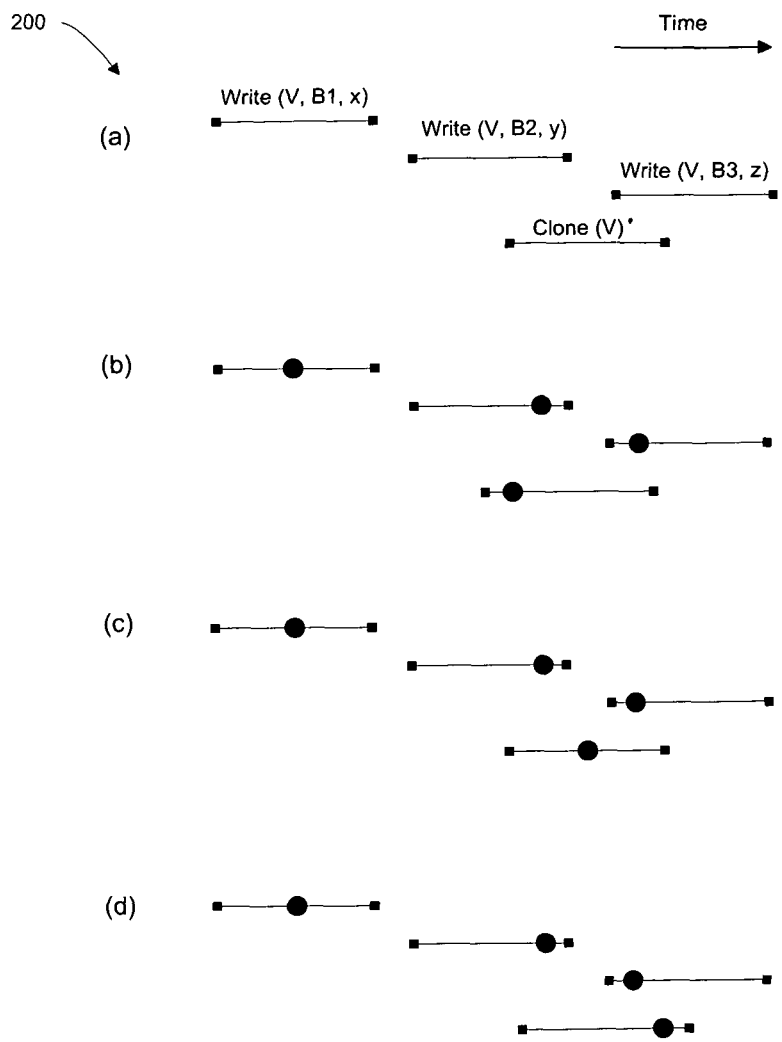
FIG. 2 is a diagram illustrating linearizability with an execution history and three alternate clone operations with parts (b)-(d) showing three ways that operations are linearized in accordance with an exemplary embodiment of the present invention.

FIG. 2 is a diagram illustrating linearizability 200 with an execution history (shown as (a)) and three alternate clone operations (shown as (b), (c), and (d)). Linearizing means choosing a point-in-time (between the operation's start and end) at which the operation appears to happen. In this figure, time flows to the right. There are four operations: three writes to volume V for blocks B1, B2, and B3 with data x, y, and z, respectively, and one clone operation on V. These operations have start and end times represented by the endpoints of the lines below each operation. Linearizability requires operations to appear to take effect at a single point (shown as a black disk) on these lines. Parts (b), (c), and (d) show some points in time where each operation occurs in accordance with linearizability. In (b), the clone operation "happens" at a point after the write to B1 but before the other writes. As a result, the clone incorporates the first write but not the others. In (c) and (d), the clone operation happens at a different place and so the clone incorporates different sets of writes. In (c), the clone operation "happens" after the writes to B1 and B2, and so it incorporates these writes but not the write to B3. In (d), the clone happens after all writes, so it incorporates all of them. All these behaviors are allowed by linearizability. One behavior not allowed by linearizability is for the clone to incorporate the writes to B1 and B3, but not the one to B2, because there is no way to assign points to each operation to produce this behavior.

Linearizability captures the intuition that if two operations are concurrent then they may be ordered arbitrarily, while if they are sequential then they follow real time ordering. Linearizability is similar to sequential consistency but different because sequential consistency allows an operation to appear to take place after the operation has completed or before the operation has begun. For example, with sequential consistency, the clone could exclude all writes in FIG. 2 part (a), i.e., the clone appears to occur at a point before all writes. This could occur with an implementation that did not see frequent writes because they are still in some buffer; this implementation, however, would not satisfy linearizability.

Linearizability also implies crash consistency, which is a consistency condition for snapshots (or clones) that require the state captured by a snapshot to be one that could have resulted from halting the system unexpectedly (crash). Crash consistency means that a branch initially captures some state that could have resulted from a crash. The recovery procedure typically involves writing data to the volume, and might require user choices, such as whether to delete unattached inodes; and so it is performed at a clone derived from a snapshot.

Storage volumes that are related by branching have common data that shares the storage medium. This provides not just space efficiency, but also time efficiency since sharing allows branches to be quickly created by manipulating data structures. In order to discuss this structure, logical offsets or blocks are relative to the high-level storage volume, whereas physical offsets or blocks are relative to the storage medium (disks).

Each storage node or brick needs logical-to-physical maps that indicate where each logical address of a volume is mapped. This is a map from [volume, logical-offset] to [disk, physical-offset]. Because it takes too much space to maintain this map on a byte-per-byte basis, the map is kept at a coarser granularity in terms of disk allocation units, which are chunks of L consecutive bytes where L is some multiple of 512 bytes. L is called the disk allocation size, and it provides a trade-off between flexibility of allocation and the size of the map. It is also useful to think in terms of the reverse physical-to-logical map, which indicates the volume and logical offset that correspond to each disk and physical offset. This map is one-to-many, because storage volumes may share physical blocks. The sharing list of a physical block B is the result of applying this map to block B: it indicates the set of all storage volumes that share B (strictly speaking, the map also indicates the logical offset where the sharing occurs, but this offset is the same for all volumes sharing B).

When a write occurs to a block that is being shared, the sharing is broken and the sharing list shrinks. Sharing can be broken in two ways: either the volume being written gets allocated a new block B' (move-on-write), or the volume being written retains B while the old contents of B are copied to B' (copy-on-write). In the common case, there will be exactly one volume V in the sharing list of B or B' (the volume where the write occurs) and the other list will be equal to the original list minus V (the volumes that should preserve the contents before the write). However, there are situations in which the split results in more than one volume in both B and B'. Those situations are due to recovery reads. To handle the repair of partial writes, writes are applied to otherwise non-writable snapshots, to reinforce the state of existing data across a quorum of replicas.

To tolerate failures, exemplary embodiments use quorum-based replication modified to work with real distributed storage systems. Storage is replicated at many storage nodes or bricks. Data is accessible if a quorum of bricks is operational and accessible through the network. A quorum means a majority, but other types of quorums are possible. Majorities can vary with time because of variance in network delays and brick load, causing one or another brick to be temporarily slow to respond, or because of brick crashes. To write new data, a coordinator propagates the data with a timestamp to a majority of bricks; the timestamp comes from the coordinator's local clock, which is nearly synchronized with other coordinators' clock most of the time. To read data, a coordinator queries the data at a majority of bricks and decides which data is the most recent using the timestamp. Because any two majorities intersect, at least one brick returns to the coordinator the most recently written data. For example, assume three separate bricks (brick 1, 2, and 3) are coupled to a coordinator in a network. These three bricks store data for block B. Initially, data x with timestamp 1 is stored at bricks 1 and 2, a majority. Later in time, data y with timestamp 5 is stored at bricks 2 and 3, another majority. Later yet, a read gets data from bricks 1 and 2. Y is chosen since it has a higher timestamp.

A partial write occurs when the coordinator crashes while writing to some block B. The crash causes the new data to be propagated to only a minority of replicas. In this scenario, the system is left in a non-deterministic state because a subsequent read can return either new or old value, depending on whether the majority that reads intersects the minority that wrote. A subsequent read returns different values depending on which majority responds first, as determined by network and other delays. For instance, if the majority is bricks 1 and 2, the read returns x. On the other hand, if the majority is bricks 2 and 3, the read returns y due to its higher timestamp. This discrepancy could lead to the problem of oscillating reads: as majorities change over time, consecutive reads return different values even though there are no writes. To prevent such oscillation, the coordinator executes a repair phase, in which it writes back or propagates the value read to a majority of replicas with a new timestamp. In the example, the repair phase writes back x or y with a higher timestamp, say 8, to a majority of bricks.

If some coordinator writes while another coordinator reads, the repair phase of the read may obliterate an ongoing write. Continuing with the example of bricks 1, 2, and 3, y may be at a minority of bricks not because the coordinator crashed, but because it has not yet finished propagating y. As both write and read coordinators continue to execute, the write back of x may obliterate the write of y.

This potential conflict is addressed through an initial announce phase in which a coordinator announces to a majority of bricks the timestamp that it wants to use; each brick remembers the largest announced timestamp. Thus, write operations execute two phases: announce and propagate. For reads, the announce phase is combined with querying the data at bricks, so reads also execute two phases: (1) announce+query and (2) propagate. Each phase can involve a different majority of bricks. In the second phase, if a coordinator propagates a value with a smaller timestamp than the largest announced timestamp at a brick, the brick rejects the value and returns an error. This rejection, in turn, causes the coordinator to return an error to the client. Typical clients (example, an operating system) then retry the operation for a few times. The announce phase helps to deal with a stale timestamp. Specifically, if some value at a brick has timestamp T, then T has been announced at a majority of bricks, and so a coordinator that tries to execute with a smaller timestamp gets an error. The announce phase also allows a simple optimization for reading. Specifically, in the first phase, if all bricks return the same data with same timestamp and indicate that no higher timestamp has been announced, then the repair phase is not needed since the data already has the highest timestamp among all bricks including those that did not respond.

In the above description, the coordinator reads or writes a single block, but the scheme allows operation on a range of blocks, by packaging together information for multiple blocks in the messages of the protocol.

The sharing list of a physical block B is the set of all storage volumes that share B. The sharing list changes over time as new data gets written to volumes. For example, consider the version tree in FIG. 1C and suppose that logical block b of volumes S1, S3, V2 and V3 are sharing the same physical block B. Then, the sharing list for B is {S1, S3, V2, V3}. If a user writes new data to block b of volume V3, then a new physical block B' is allocated for volume V3 (assuming move-on-write instead of copy-on-write). The sharing list for B is reduced to {S1, S3, V2}, and the sharing list created for B' is {V3}.

In one exemplary embodiment, read-only snapshots also get their blocks updated because of the repair phase of reads. For example, if the sharing list for B is {S1, S3, V2, V3} and there is a read on snapshot S3 that requires writing back to S3, then a new physical block B' is allocated for the data being written back (assuming move-on-write) and the sharing list for B' is set to {S3, V2, V3}, while the sharing list for B gets reduced to {S1}.

The general rule for splitting a sharing list L is that the volume V being written (or written back) and all its children in L share the newly written contents, while the other volumes in L share the old contents. This rule is consistent with the fact that descendants of node V represent later versions of that node, and so if there is a change on V to fix non-determinism then descendants of V that are sharing data with V also need to fix the non-determinism in the same way.

Exemplary embodiments provide at least two forms of consistency: replica consistency and branching consistency. To achieve replica consistency, when creating a new storage branch, a user sends a request to one of the bricks, example brick c. Based on the type of the new branch, brick c decides how the version tree needs to be updated and then propagates this update to other bricks. This propagation is done with uniform reliable broadcast that ensures that if one brick receives the update then all live bricks also receive the update, despite failures, thus ensuring eventual consistency.

While the propagation occurs, however, bricks will have divergent version trees. For example, if a new snapshot of V2 is taken from the embodiment in FIG. 1C, bricks will eventually arrive at the tree in FIG. 1B, where S3 is the new snapshot. If a new write occurs and all bricks have the tree in FIG. 1B, then the write results in a copy-on-write on all replicas to preserve the contents for snapshot S3.

With regard to FIG. 1A-1C, the following question is considered: What happens if the new snapshot is still propagating, and some bricks have FIG. 1A while others have FIG. 1B? In this scenario, the coordinator for the write decides what to do, and the replicas just follow that decision. Exemplary embodiments implement this procedure by having a version number associated with writable volumes. This number is incremented every time the volume gets a new snapshot. The number is the depth of the volume's node in the tree if snapshots are not deleted, but could be higher if snapshots are deleted.

By way of example, FIG. 3 is a diagram illustrating version numbers associated with writable volumes V1 and V2 (leaves) for a given version tree 300 in accordance with an exemplary embodiment of the present invention. The current version of V1 and V2 is 3; version 2 of V1 is snapshot S2, while version 1 is snapshot S1. When executing a write on a volume, the coordinator reads the volume's version according to its local view; bricks receiving a write from the coordinator use that number to decide where the write gets stored. For example, if the coordinator decides to write version 2 of volume V2 (because the coordinator's version tree is slightly out of date and does not have snapshot S3 yet), then a brick that has snapshot S3 will store the new data by overwriting data for S3 rather than doing a copy-on-write. This procedure ensures that replicas treat all writes consistently.

To achieve branching consistency, the coordinator of a write checks that the version number that it wants to pick is the same at a majority of bricks. If not, the coordinator picks the highest version number seen and retries, until successful. This process is called the version-retry technique (see FIG. 4), which enables exemplary embodiments to obtain consistency.

Figure 4:
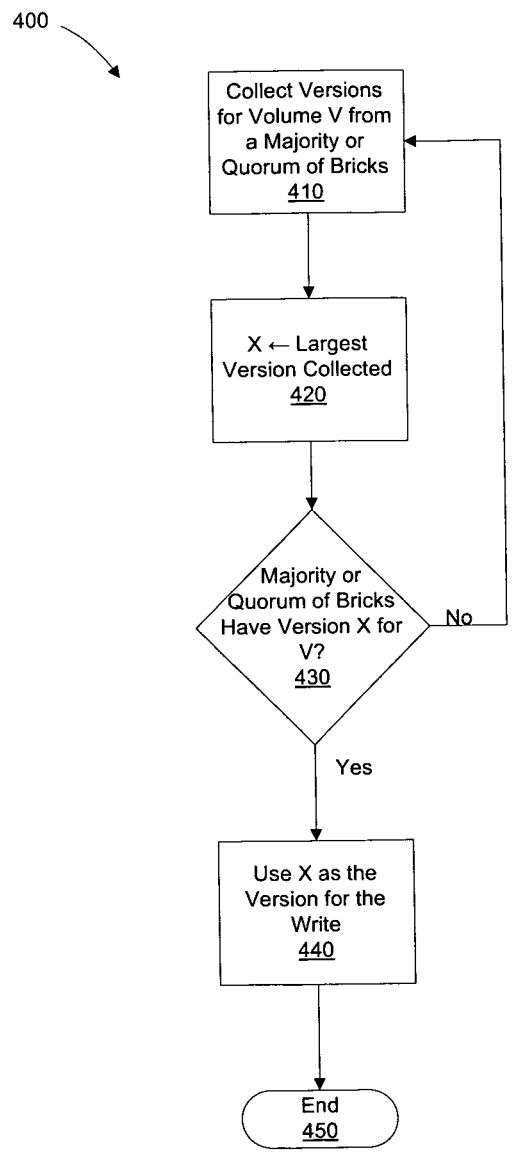
FIG. 4 shows a block diagram of a version-retry technique to achieve branching consistency in accordance with an exemplary embodiment of the present invention.

FIG. 4 shows a block diagram of a version-retry technique 400 to achieve branching consistency in accordance with an exemplary embodiment of the present invention. According to block 410, collect versions for volume V from a majority or quorum of bricks with X being the largest version collected per block 420. Then according to block 430, a question is asked: Does the majority of quorum of bricks have version X for V? If the answer to this question is "no" then flow proceeds back to block 410. If the answer to this question is "yes" then flow proceeds to block 440 wherein X is used as the version for the end. Flow then ends at block 450.

In some storage systems, writes employ a two-phase protocol where the written data is transmitted only in the second phase. In such systems, this process can be piggybacked on the first phase of the two-phase write protocol, and so it has little additional cost if the coordinator does not have to retry, which is the common case. In the second phase of the two-phase write, which is when the data actually gets written to each brick, the coordinator notifies bricks which version k it picked along with the data and timestamp to be written. When a brick receives this information, the brick stores the data in the appropriate physical block according to the logical-to-physical map. If that block is being shared with many volumes, the sharing is broken as previously discussed.

The above technique, whereby the coordinator retries the first phase until a majority of replica bricks have identical version numbers, effectively delays writes while a snapshot is taken. This procedure is different from the well-known but simplistic technique of pausing I/O's (input/outputs) during a snapshot, in which the coordinator acts in three phases: it first tells bricks to pause their I/O's, then it tells bricks that branching has occurred, and finally it tells bricks to resume I/O's. This simplistic technique is slow because there are three sequential phases, where each phase requires all bricks (not just a majority) to acknowledge before moving to the next phase. Requiring all bricks to respond eliminates the benefits of quorums. In contrast, in at least one exemplary embodiment, only a quorum of bricks needs to respond, and the necessary delays are embedded within the write protocol without the need for explicit pause and resume actions. The result is less time to take snapshots (and hence smaller write delays during snapshots), and less complex handling of failures. Thus, uniform reliable broadcast ensures that the snapshot information eventually propagates to the live replicas, regardless of failures, and so a write does not get stuck.

As previously discussed, reads use a repair phase to fix nondeterministic states that arise from partial writes. For example, suppose that there are three bricks (bricks 1, 2, and 3 as in FIG. 1A) and some logical block B has value x, which is shared between volumes S1 and V2 at all bricks. Now suppose there is a write for B in volume V2 with data y, but the write is partial and only reaches brick 3, due to a failure of the write coordinator. Thus, at brick 3, the sharing of B has been broken, but this is not so at the other bricks. Now suppose that a new snapshot of V2 is taken resulting in the version tree as in FIG. 1B at all bricks.

The resulting situation for logical block B is that brick 3 has data x for S1 and data y for {S3, V2}, while brick 1 and brick 2 have data x for {S1, S3, V2}. Now suppose there is a read for B in volume V2. While executing the read, suppose brick 1 and brick 2 respond to the coordinator, but brick 3 is slow. Then x is picked as the value being read, and there is a write back of x for volumes S1, S3, and V2 with a new timestamp. This causes brick 3 to restore back the sharing between S1, S3, and V2. It also causes all bricks to adopt the new timestamp for B in volumes S1, S3, and V2, not just for V2. The reason is to ensure that y cannot be read for any of these volumes. In fact, when the system resolves the non determinism for V2 by deciding that the failed write of y never occurred, then it must make a consistent decision for the previous snapshots S1 and S3.

Figure 5:
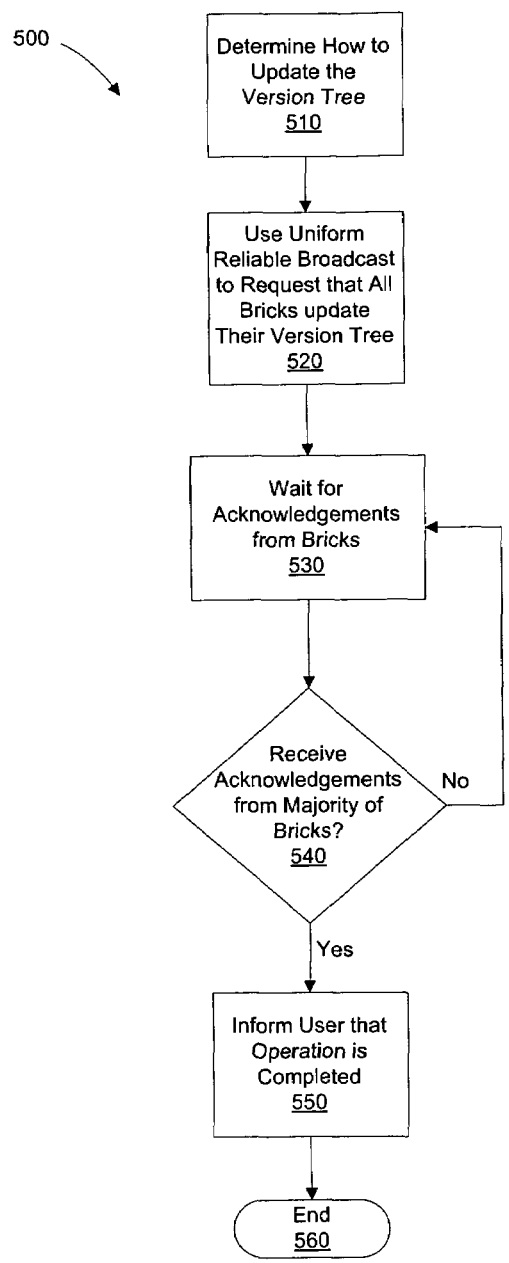
FIG. 5 shows an exemplary procedure for creating a snapshot of a volume or clone of a snapshot in accordance with an exemplary embodiment of the invention.

Exemplary embodiments create snapshots of writable volumes, clones of snapshots, and clones of writable volumes. FIG. 5 shows an exemplary procedure 500 for creating a snapshot of a volume or clone of a snapshot in accordance with an exemplary embodiment of the invention. According to block 510, a determination is made as to how to update the version tree (see procedure in FIG. 1D). Next, use uniform reliable broadcast to request that all bricks updater their version tree according to block 520. Then in block 530, wait for acknowledgements from the bricks. In block 540 a question is asked: Are acknowledgements received from a majority of the bricks? If the answer to this question is "no" then flow proceeds back to block 530. If the answer to this question is "yes" then inform the user that the operation is completed according to block 550 and then end t block 560.

In one exemplary embodiment, creating a snapshot of a volume V occurs as follows: it simply requires updating the version tree and incrementing the version number of V at a majority of bricks. This process is done using uniform reliable broadcasts to ensure that the updates are propagated regardless of failures. The brick creating a snapshot waits until a majority of bricks have acknowledged the updates before telling the user that the operation is completed. This delay is necessary because reads to the snapshot should be prohibited until a majority of bricks have received the update: otherwise, two reads to the same snapshot could return different data (this could happen if a write occurs to the volume being snapshotted).

To create a clone of a snapshot S (see also FIG. 5), a brick updates the version tree, propagates the update using uniform reliable broadcast, and waits for a majority of acknowledgements. To create a clone of a writable volume V, a brick simply creates a snapshot S of V and then creates a clone of S, using the above procedures.

If two clients simultaneously take snapshots of the same volume, there is a chance that both get the same snapshot. This situation is not problematic since snapshots are read-only. As for clones, it is desirable to actually create multiple clones, and so the coordinator adds a unique identifier to clones, namely, an id (identification) for the coordinator plus an increasing number.

All storage blocks are not required to be replicated across all bricks. Instead, if there are many bricks, it may be desirable to replicate blocks at some of the bricks in a way that spreads load. The set of bricks that replicate a block is called a replica group. A real system with many bricks will have many replica groups, and in general they need not intersect.

To snapshot a volume, bricks at all replica groups coordinate to ensure that branching takes effect atomically. In one exemplary embodiment, while the relatively infrequent snapshot operation contacts a majority of bricks in every replica group, the more common read and write operations only has to contact the replica group of the block involved. To do this, one exemplary embodiment uses the notion of a stable version: version v of a volume is stable if the current version is at least v at a majority of bricks in all replica groups. This embodiment ensures that if a brick reads or writes using version v, then v is stable. Note that if v is stable then no operations in any replica group use a version smaller than v, because of the version-retry technique. This provides consistency across replica groups.

A variable stableVersion keeps the largest version that a brick knows to be stable, and it is updated as follows. When a coordinator takes a snapshot of a volume, it uses a uniform confirmed broadcast to ensure that a volume's stableVersion is only incremented after a majority of bricks in every replica group of the volume has incremented their currentVersion. Thus, uniform confirmed broadcast ensures that (1) either all correct bricks (in all replica groups) deliver a message, or none do, and (2) if the broadcaster does not fail then all correct bricks get the message. Exemplary embodiments also provide a confirmation of the broadcast through the primitive confirm-deliver. Confirm-deliver(m) informs a brick that message m has been delivered at a quorum of bricks, where quorum means a majority of bricks in each replica group. Uniform confirmed broadcast ensures that (1) either all bricks get confirm-deliver(m), or none do, (2) if some brick delivers m, then all correct bricks get confirm-deliver(m).

When a brick delivers a message with a new version, it updates its currentVersion variable. When a brick gets a confirmation for this message, it updates its stableVersion variable. This ensures that a version currentVersion is stable when stableVersion≥currentVersion.

When a coordinator starts a read or write on a volume, it initially waits until its version currentVersion for the volume is stable. The coordinator does not need to contact other bricks to determine this stability because it keeps track of versions already known to be stable using the stableVersion. In a common case, the coordinator is not required to wait since currentVersion is likely already stable. Once currentVersion is stable, the read or write operation is executed on this version of the volume.

In some exemplary embodiments, it is useful to clone or snapshot many volumes simultaneously and atomically (an operation called multi-volume branching). For example, a database system stores the log and tables in separate volumes. If the table and log volumes are separately cloned, then the cloned log can be out of sync with the cloned tables. With multi-volume branching, the cloning of two or more volumes atomically occurs and ensures consistency between the volumes. In terms of linearizability, cloning of all volumes appears to take place at a single point in time, rather than having a different point for each volume.

Exemplary embodiments provide multi-volume branching using a same mechanism as replica groups: stable versions and uniform confirmed broadcast. A snapshot or clone operation uses uniform confirmed broadcast to contact all bricks that serve the volumes being branched. The broadcast carries new version numbers for each volume being branched. When the message is delivered, it causes a brick to increment the currentVersions of the volumes and causes a brief delay on new writes to those volumes. Soon after, the confirmation of delivery makes those versions stable and allows new writes to continue.

A user deletes a volume by sending a request to one of the bricks that acts as the coordinator for other storage operations. The coordinator reliably broadcasts the requests to all bricks.

Upon receipt of the request, a brick p does the following. It removes the volume from the sharing list of all physical blocks. If the sharing list has become empty for a physical block, the block is marked as free. Brick p then updates the version tree by marking the volume's node as deleted, but the node is not yet removed from the tree, for two reasons. First, the node may have children that are not deleted, and so it should remain in the tree while the children are there. Second, even if the node has no children, another coordinator may be trying to branch the volume while it is being deleted. The actual removal of nodes form the tree happens through a periodic pruning where entire branches are removed: a node is only removed if all its children are marked deleted. This periodic pruning is performed with a two-phase protocol that quits after the first phase if any node to be pruned is being branched.

FIG. 6 provides an exemplary algorithm 600 for uniform confirmed broadcast by using point-to-point messages in accordance with an exemplary embodiment of the present invention. To broadcast a message, a brick proceeds in four phases. In each phase, the brick sends the message and phase number to all bricks and waits to receive acknowledgements from a quorum of bricks (where quorum means a majority of bricks in each replica group). When a brick receives a message from a phase, the brick sends back an acknowledgement to the sender. In addition, if the phase is 2, the brick delivers the message, and if the phase is 3, the brick confirms the message. If a brick receives a message for phases 1, 2, and 3, but does not receive a message for the following phase after a given time period, then the brick suspects that the sender has failed. The brick then takes over the job of the sender.

Figure 7:
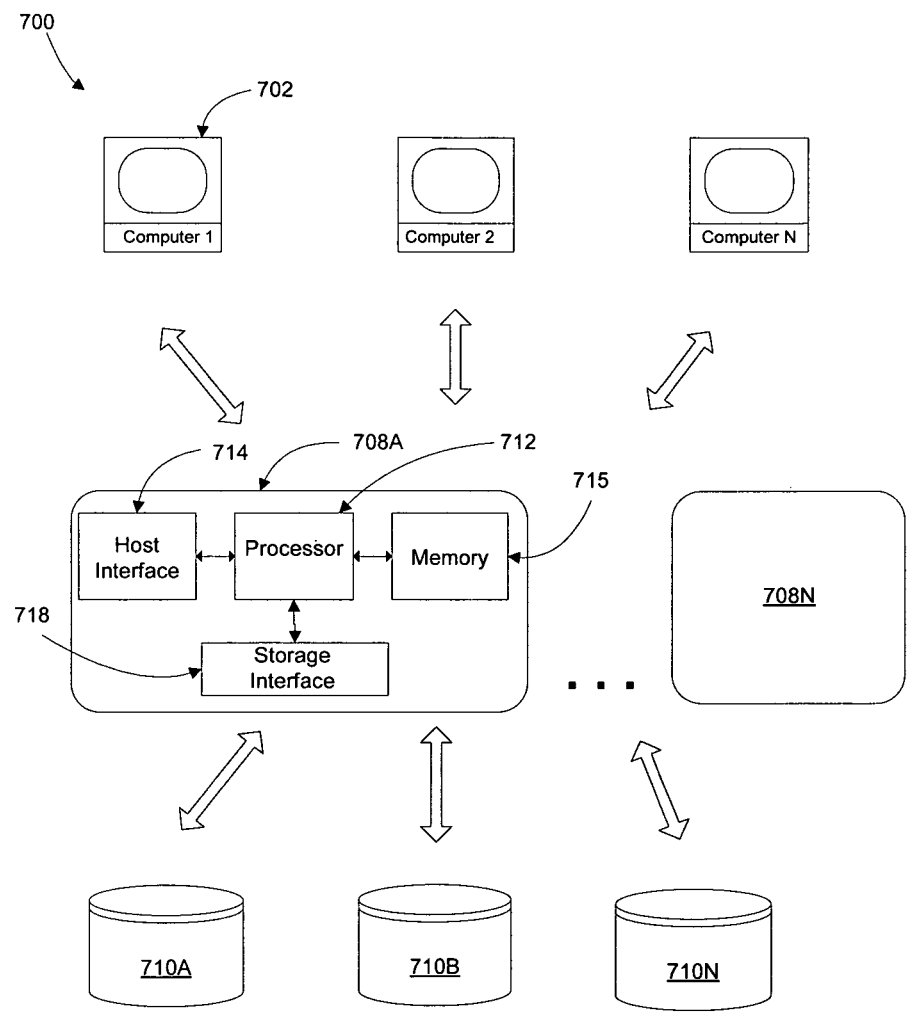
FIG. 7 is an exemplary block diagram for a distributed storage system in accordance with an exemplary embodiment of the present invention.

FIG. 7 is a block diagram of an exemplary distributed storage system (DSS) 700 in accordance with an exemplary embodiment. The DSS 700 includes a plurality of computers 702 (of which computer 1 to computer N are exemplary) and a plurality of storage bricks 708A-708N connected to a plurality of storage devices 710A-710N.

In one exemplary embodiment, the storage devices are network attached devices providing random access memory (RAM) and/or disk space (for storage and as virtual RAM) and/or some other form of storage such as tapes, micromechanical systems (MEMS), optical disks or the like, for use by the computers 702. Typically, the storage devices include larger amounts of RAM and/or disk space than are available at computers 702. Storage devices also include more specialized devices, such as network disk drives or disk drive arrays, (example, redundant array of independent disks (RAID)), high speed tape, magnetic random access memory (MRAM) systems or other devices, and combinations thereof. In one exemplary embodiment, the storage devices are separate and independent disk arrays.

The bricks 708 manage various data storage and retrieval operations. For instance, a brick receives data read requests and data write requests from one or more computers 702. The bricks coordinate the storage and retrieval of data on the multiple storage arrays.

By way of example, a brick includes a processor 712 that performs various operations and tasks necessary to manage the various data storage and data retrieval requests received from computers 702. For instance, processor 712 is coupled to a host interface 714 that provides a bidirectional data communication interface to one or more computers 702 and is coupled to a memory 715. Storage interface 718 provides bidirectional data communication with the storage devices 710.

Embodiments in accordance with the present invention are not limited to any particular type or number of storage devices and/or computer systems. The computer system, for example, includes various portable and non-portable computers and/or electronic devices. Exemplary computer systems include, but are not limited to, computers (portable and non-portable), servers, main frame computers, distributed computing devices, laptops, and other electronic devices and systems whether such devices and systems are portable or non-portable.

In further exemplary embodiments, the hosts of the distributed storage system are not required to be homogenous. In other words, hosts have different memory sizes and processors and run different operating systems. Further, such hosts can be general purpose computers, appliances, or components of a general purpose computer.

The network connecting computers and memory nodes can be any medium, device, or mechanism that allows nodes to communicate. Further, these nodes are not required to be homogenous or unique. Multiple different networks can connect the nodes, where each network has different characteristics. For example, one network uses wires, another uses radio transmissions, etc. Further, portions of the networks can have different bandwidths, latencies, packet sizes, access mechanisms, reliability protocols, and ordering guarantees, to name a few examples.

As used herein, the term "disk array" means a linked group of one or more independent disk drives. By way of example, the disk arrays include daisy chain configuration or RAID technology and organize data storage into logical units (LUs) that appear as linear blocks to users.

In one exemplary embodiment, one or more blocks or steps discussed herein are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. For instance, blocks in diagrams or numbers (such as (1), (2), etc.) should not be construed as steps that must proceed in a particular order. Additional blocks/steps may be added, some blocks/steps removed, or the order of the blocks/steps altered and still be within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method performed by a computer system, comprising:
in a distributed replicated storage system of storage nodes that utilizes quorum-based replication, providing point-in-time branching of storage by (i) coordinating replicas of storage volumes represented by replicas of data blocks constituting the storage volumes with each version of a storage volume corresponding to one of a writable volume, a read-only snapshot that preserves the state of a storage volume at a given point in time, and a writable clone that can change independently of its source storage volume, and (ii) capturing distributed state of the storage volume replicas in a version tree that describes how the storage volume versions relate to one another, wherein nodes in the version tree correspond to respective ones of the storage volumes;
generating a snapshot of a storage volume in the distributed replicated storage system, wherein the generating comprises, each time a snapshot of a writable storage volume is created, associating the writable storage volume in the version tree with a version number that is incremented at a quorum of the storage nodes in the distributed replicated storage system for each replicated data block of the writable storage volume; and
writing new data to a replicated data block in a selected one of the storage volumes, wherein the writing comprises selecting a version number of the selected storage volume, announcing the selected version number and an associated timestamp to a quorum of the storage nodes, if the selected version number corresponds to the version number at a majority of the storage nodes propagating the new data to the majority of the storage nodes, and if the selected version number does not correspond to the version numbers at a majority of the storage nodes selecting the highest one of the version numbers reported by a majority of the storage nodes as the selected version number and propagating the new data to the majority of the storage nodes.

2. The method of claim 1, wherein the generating further comprises, for each data block of the storage volume of which a snapshot is being generated, waiting for a quorum of storage nodes to acknowledge successful increment of the writeable storage volume version number before completing the generating of the snapshot.

3. The method of claim 1, wherein further comprising:
updating a first variable when a respective one of the storage nodes delivers a message with a new version to other storage nodes; and
updating a second variable when the respective storage node receives confirmation from a quorum of the other storage nodes that received the message.

4. The method of claim 1, further comprising cloning different ones of the storage volumes to create clones of the different storage volumes that appear to be created at a single point-in-time throughout the distributed storage system.

5. The method of claim 1, further comprising reading written data from a replicated data block in a selected version of a selected one of the storage volumes, wherein the reading comprises querying the written data at a majority of the replicas of the of the replicated data block being read, determining which of the queried written data is most recent based on the timestamp associated with the written data, and reading the most recent written data.

6. The method of claim 5, further comprising, after the reading, associating the most recent written data with a new timestamp and writing back the most recent written data and the new timestamp to a majority of the replicas of the read replicated data block, in the selected version of the selected storage volume and in all previous versions of the selected storage volume.

7. The method of claim 1, wherein the generating comprises, each time a snapshot of a writable storage volume is created, incrementing the version number that is associated with the writable storage volume at the quorum of the storage nodes using a broadcast protocol that ensures that if one storage node receives the update then all live storage nodes also receive the update.

8. The method of claim 1, wherein the selecting of the highest one of the version numbers reported by a majority of the storage nodes as the selected version number comprises repeatedly selecting the highest version number reported by the storage nodes and re-announcing the selected highest version number and an associated timestamp to the quorum of the storage nodes until the selected highest version number corresponds to the version number at a majority of the storage nodes.

9. A physical storage media having software programming code which, when executed by a computer, causes the computer to perform operations comprising:
in a distributed replicated storage system of storage nodes that utilizes quorum-based replication, providing point-in-time branching of storage by (i) coordinating replicas of storage volumes represented by replicas of data blocks constituting the storage volumes with each version of a storage volume corresponding to one of a writable volume, a read-only snapshot that preserves the state of a storage volume at a given point in time, and a writable clone that can change independently of its source storage volume, and (ii) capturing distributed state of the storage volume replicas in a version tree that describes how the storage volume versions relate to one another, wherein nodes in the version tree correspond to respective ones of the storage volumes;

generating a snapshot of a storage volume in the distributed replicated storage system, wherein the generating comprises, each time a snapshot of a writable storage volume is created, associating the writable storage volume in the version tree with a version number that is incremented at a quorum of the storage nodes in the distributed replicated storage system for each replicated data block of the writable storage volume; and writing new data to a replicated data block in a selected one of the storage volumes, wherein the writing comprises selecting a version number of the selected storage volume, announcing the selected version number and an associated timestamp to a quorum of the storage nodes, if the selected version number corresponds to the version number at a majority of the storage nodes propagating the new data to the majority of the storage nodes, and if the selected version number does not correspond to the version numbers at a majority of the storage nodes selecting the highest one of the version numbers reported by a majority of the storage nodes as the selected version number and propagating the new data to the majority of the storage nodes.

10. A computer system, comprising:

a memory for storing processor-readable instructions; and a processor coupled to the memory, operable to execute the processor-readable instructions, and based at least in part on the execution of the instructions operable to perform operations comprising:

in a distributed replicated storage system of storage nodes that utilizes quorum-based replication, providing point-in-time branching of storage by (i) coordinating replicas of storage volumes represented by replicas of data blocks constituting the storage volumes with each version of a storage volume corresponding to one of a writable volume, a read-only snapshot that preserves the state of a storage volume at a given point in time, and a writable clone that can change independently of its source storage volume, and (ii) capturing distributed state of the storage volume replicas in a version tree that describes how the storage volume versions relate to one another, wherein nodes in the version tree correspond to respective ones of the storage volumes;

generating a snapshot of a storage volume in the distributed replicated storage system, wherein the generating comprises, each time a snapshot of a writable storage volume is created, associating the writable storage volume in the version tree with a version number that is incremented at a quorum of the storage nodes in the distributed replicated storage system for each replicated data block of the writable storage volume; and writing new data to a replicated data block in a selected one of the storage volumes, wherein the writing comprises selecting a version number of the selected storage volume, announcing the selected version number and an associated timestamp to a quorum of the storage nodes, if the selected version number corresponds to the version number at a majority of the storage nodes propagating the new data to the majority of the storage nodes, and if the selected version number does not correspond to the version numbers at a majority of the storage nodes selecting the highest one of the version numbers reported by a majority of the storage nodes as the selected version number and propagating the new data to the majority of the storage nodes.

* * * * *